US 11,526,730 B2

(12) United States Patent
Ito

(10) Patent No.: US 11,526,730 B2
(45) Date of Patent: Dec. 13, 2022

(54) GROWTH ANALYSIS SYSTEM, GROWTH ANALYSIS METHOD, AND GROWTH ANALYSIS PROGRAM

(71) Applicant: NEC CORPORATION, Tokyo (JP)

(72) Inventor: Kentaro Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 438 days.

(21) Appl. No.: 16/795,683

(22) Filed: Feb. 20, 2020

(65) Prior Publication Data

US 2020/0285941 A1 Sep. 10, 2020

(30) Foreign Application Priority Data

Mar. 6, 2019 (JP) .................. 2019-040312

(51) Int. Cl.
*G06F 15/18* (2006.01)
*G06N 3/04* (2006.01)
*G06N 3/08* (2006.01)

(52) U.S. Cl.
CPC ............ *G06N 3/0454* (2013.01); *G06N 3/08* (2013.01)

(58) Field of Classification Search
CPC ............................... G06N 3/0454; G06N 3/08
See application file for complete search history.

(56) References Cited

U.S. PATENT DOCUMENTS

| 2019/0095778 | A1* | 3/2019 | Buchanan | ............... | G16B 40/00 |
| 2019/0139622 | A1* | 5/2019 | Osthege | ................ | G16B 20/00 |
| 2019/0171187 | A1* | 6/2019 | Cella | ..................... | G06N 20/00 |

FOREIGN PATENT DOCUMENTS

| CN | 201830751 U | * | 5/2011 |
| CN | 109886999 A | * | 6/2019 |
| JP | 2000-50732 A | | 2/2000 |
| JP | 2015-84677 A | | 5/2015 |
| JP | 2016-183931 A | | 10/2016 |

OTHER PUBLICATIONS

Communication from Japanese Patent Office dated Jun. 9, 2020 in application No. 2019-040312.

* cited by examiner

*Primary Examiner* — Xin Jia
(74) *Attorney, Agent, or Firm* — Sughrue Mion, PLLC

(57) ABSTRACT

A growth analysis system (1) according to an example aspect of the present disclosure, comprising a correlation deriving unit (60) comprising a first neural network that uses growth condition information as input data to output contained component information as output data. The correlation deriving unit (60) causes the first neural network to learn by repeatedly performing deep learning using, as training data, the growth condition information and the contained component information indicating the component contained in the organisms that are actually grown in accordance with the growth condition.

8 Claims, 5 Drawing Sheets

GROWTH ANALYSIS SYSTEM, GROWTH ANALYSIS METHOD, AND GROWTH ANALYSIS PROGRAM

INCORPORATION BY REFERENCE

This application is based upon and claims the benefit of priority from Japanese patent application No. 2019-40312, filed on Mar. 6, 2019, the disclosure of which is incorporated herein in its entirety by reference.

TECHNICAL FIELD

The present disclosure relates to a growth analysis system, a growth analysis method, and a growth analysis program, and in particular, to a growth analysis system, a growth analysis method, and a growth analysis program that analyze one or more organisms to be grown.

BACKGROUND ART

Various kinds of techniques for analyzing one or more organisms have conventionally been proposed. For example, in the plant cultivation apparatus disclosed in Japanese Unexamined Patent Application Publication No. 2016-183931, a growth space for housing a predetermined minimum number of plants are formed, and under the environmental condition where each element that affects the growth of one or more plants can be adjusted, the component of a growing plant is analyzed in a state where the plants are housed in the growth space.

SUMMARY

However, the plant cultivation apparatus disclosed in Japanese Unexamined Patent Application Publication No. 2016-183931 has a problem that although it can analyze the component of the growing plant, it cannot derive a correlation between a growth condition such as an environmental condition of one or more plants to be grown and the component contained in the plants that are grown in accordance with the growth condition.

The present disclosure has been made in view of the aforementioned problems and its object is to provide a growth analysis system, a growth analysis method, and a growth analysis program that can derive a correlation between a growth condition of one or more organisms to be grown and a component contained in the organisms that are grown in accordance with the growth condition.

A growth analysis system according to an example aspect of the present disclosure, comprising a correlation deriving unit comprising a first neural network that uses growth condition information as input data to output contained component information as output data, the growth condition information indicating a growth condition of one or more organisms to be grown and the contained component information indicating a component contained in the organisms, wherein
the correlation deriving unit causes the first neural network to learn by repeatedly performing deep learning using, as training data, the growth condition information and the contained component information indicating the component contained in the organisms that are actually grown in accordance with the growth condition.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EXAMPLE EMBODIMENTS

Figure 1:
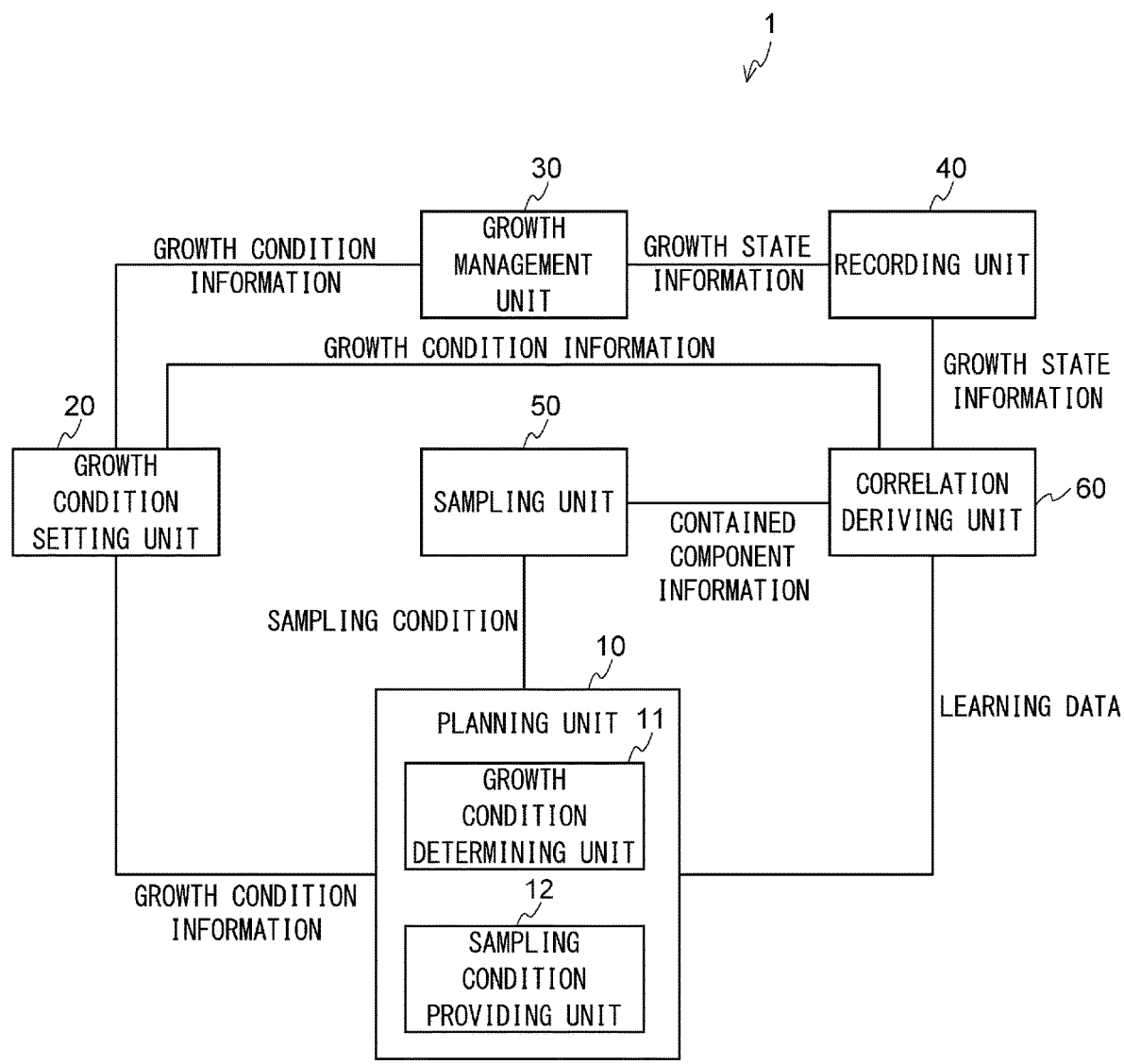
FIG. 1 is a block diagram showing a configuration of a growth analysis system 1 according to an example aspect of the present disclosure.

An example aspect of the present disclosure using one or more plants as one or more organisms to be grown is described hereinafter with reference to the drawings. FIG. 1 is a block diagram showing a configuration of a growth analysis system 1 according to an example aspect of the present disclosure. The growth analysis system 1 is a system that analyzes a growth of one or more organisms to be grown, and includes a planning unit 10, a growth condition setting unit 20, a growth management unit 30, a recording unit 40, a sampling unit 50, and a correlation deriving unit 60. As shown in FIG. 1, these functional units can perform data communication with each other through some communication cables. Note that these functional units may perform data communication through radio waves.

The planning unit 10 is an information processing apparatus that determines a growth condition of one or more plants to be grown to generate a growth plan for the plants and provides growth condition information indicating the growth condition, and that provides a sampling condition which defines various conditions relating to the sampling of the plants. Further, the planning unit 10 includes a growth condition determining unit 11 and a sampling condition providing unit 12.

The growth plan includes an initial growth plan and one or more normal growth plans. The initial growth plan is a growth condition of one or more plants in the initial stage of deep learning that is performed in a first neural network included in the correlation deriving unit 60. The growth condition includes attributes such as the temperature, the humidity, the illuminance, and the carbon dioxide concentration of the environment in which one or more plants to be grown is grown, the amount and the temperature of water given to the plants, and the types and the amounts of fertilizers, optional values being set for each of the above. When the growth condition determining unit 11 determines the growth condition of the initial growth plan, it can generate the initial growth plan by randomly determining attribute values of the growth condition. The growth condition determining unit 11 provides growth condition information indicating the growth condition of the initial growth plan to the growth condition setting unit 20.

The normal growth plan is a growth condition of one or more plants at a stage after the initial stage of deep learning that is performed in the first neural network included in the correlation deriving unit 60. The growth condition determining unit 11 includes a second neural network that uses weighted learning data provided by the correlation deriving unit 60 as input data to output growth condition information indicating various types of growth conditions of one or more plants to be grown as output data. The second neural network includes an input layer, an intermediate layer, and an output layer, and these layers are composed of artificial neurons that are programs executed by an arithmetic unit included in the growth condition determining unit 11. The weighted learning data are parameters (e.g., a weight, and a bias) that indicate a correlation between growth condition information indicating a growth condition, and growth state information indicating a state of the growth of one or more plants that is grown in accordance with the growth condition and contained component information indicating the component contained in the plants, and that are used by each artificial neuron of the first neural network. The values of these parameters are corrected by the correlation deriving unit 60 performing deep learning in the first neural network, and are optimized by repeatedly performing deep learning. The growth condition determining unit 11 provides the growth condition information indicating the growth condition output by the second neural network to the growth condition setting unit 20 as growth condition information indicating the growth condition of the normal growth plan.

Further, the growth condition determining unit 11 can use a predetermined growth condition designated by a user as a growth plan. For example, when a tendency has been found from the previous growth experiments that "as a temperature and illuminance increase, one or more plants having a higher sugar content is produced", a user can designate a temperature and illuminance as attributes of the growth condition and designate a high temperature and a high illuminance as the attribute values of the temperature and the illuminance, in order to improve the variety of one or more plants to be grown. The growth condition determining unit 11 can provide growth condition information indicating the predetermined growth condition designated by a user to the growth condition setting unit 20.

The sampling condition providing unit 12 provides a sampling condition to the sampling unit 50. The sampling condition includes a timing of sampling, plants to be sampled, the number of samplings per each individual plant, and the like. The sampling condition providing unit 12 can determine the sampling condition based on growth condition information and growth state information. In this case, the growth management unit 30 provides the growth condition information to the sampling condition providing unit 12. Further, the sampling condition providing unit 12 may randomly determine a sampling condition or may determine a sampling condition that matches a specific condition (e.g., a relatively large individual plant grown at a high temperature). Furthermore, the sampling condition providing unit 12 may determine a sampling condition at regular time intervals.

The growth condition setting unit 20 is an information processing apparatus that sets the growth condition information provided by the planning unit 10 in its own storage device and provides the growth condition information to the growth management unit 30 and the correlation deriving unit 60.

The growth management unit 30 is an information processing apparatus that grows one or more plants in accordance with the growth condition indicated by the growth condition information that is provided by the growth condition setting unit 20 and generates growth state information of the plants. The growth management unit 30 can grow a plurality of plants under one growth condition. The growth management unit 30 includes a control unit and a growth state measurement unit (not shown).

The control unit controls an air-conditioning system, a lighting device, a water supply system, and a fertilizer supply system in accordance with the growth condition of the growth plan. The air-conditioning system adjusts the temperature, the humidity, and the carbon dioxide concentration of the environment in which one or more plants are grown to the temperature, the humidity, and the carbon dioxide concentration specified by the growth condition. The lighting device adjusts the illuminance of the environment in which one or more plants are grown to the illuminance specified by the growth condition. The water supply system adjusts the amount and the temperature of water provided to one or more plants to the amount and the temperature specified by the growth condition. The fertilizer supply system provides a fertilizer of the type and the amount specified by the growth condition to one or more plants to be grown.

Figure 5:
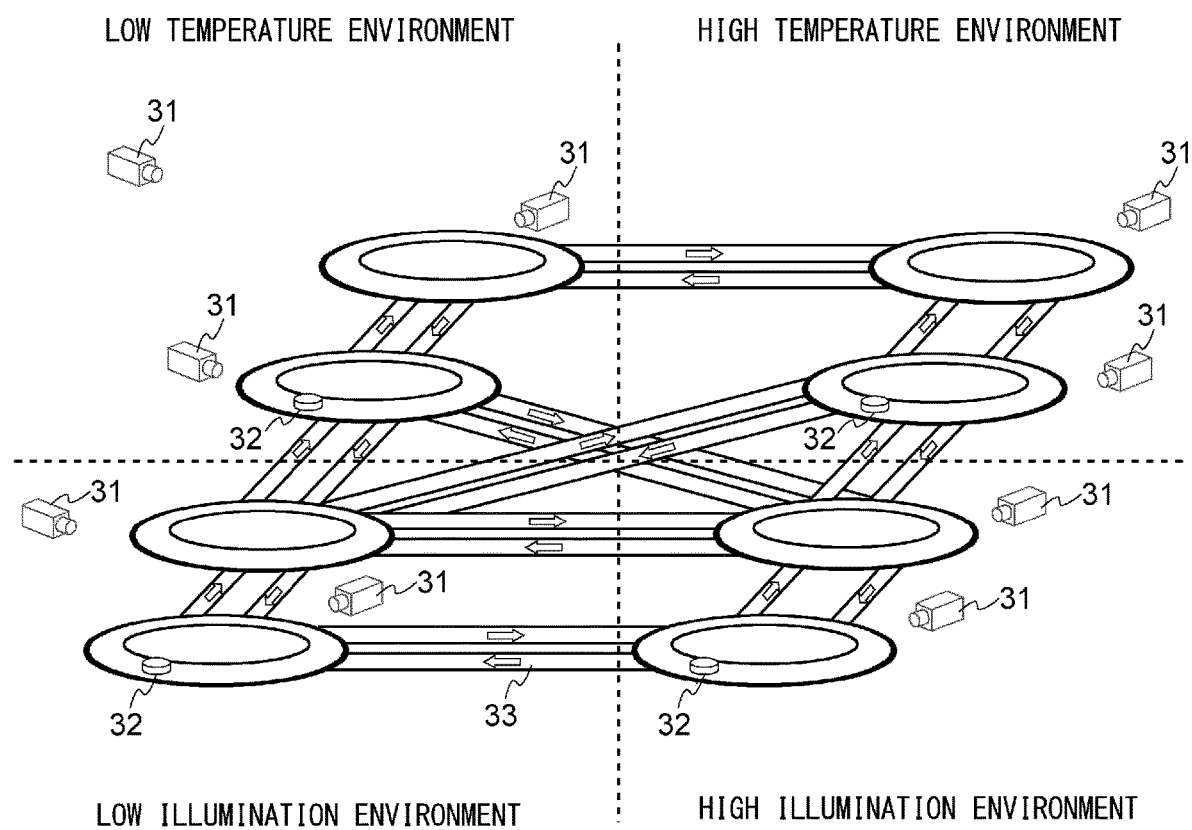
FIG. 5 is a diagram showing an example of a growth chamber of one or more plants to be grown.

In the present disclosure, one or more growth chambers can be prepared for growing plants to be grown. As shown in FIG. 5, when a plurality of growth chambers are prepared, it is possible to prepare them for each growth condition such as a low temperature environment, a high temperature environment, a low illumination environment, and a high illumination environment. One or more plants 32 to be grown may be allowed to move in each growth chamber and to other chambers by one or more conveyance means 33 such as one or more belt conveyors.

The growth state measurement unit controls cameras and weight measuring instruments to generate growth state information indicating the size, the shape, the color, the weight, and the like of each of plants to be grown, and stores the growth state information in the recording unit 40 for each individual plant. Specifically, as shown in FIG. 5, the growth state measurement unit controls each camera 31 installed in an optional position such as the vicinity of the plants to be grown or the ceiling of the room where the plants are grown in order to photograph the plants to be grown and acquire the photographed images of the plants. Next, the growth state measurement unit analyzes the photographed images of the plants to be grown, acquires growth state information such as the size, the shape, and the color of each of the plants, and stores the acquired information in the recording unit 40 for each individual plant. Further, the growth state measurement unit acquires information about the weight of each of the plants to be grown measured by the weight measuring instrument and stores the acquired information in the recording unit 40 for each individual plant. The weight measuring instrument can be configured integrally with the conveyance means 33.

In this example embodiment, when the growth state measurement unit stores growth state information of the plants to be grown in the recording unit 40 for each individual plant, the growth state measurement unit can extract feature points from each photographed image, add the same identification information to plants having the same feature points, and store the identification information and the growth state information of the plants in the recording unit 40 in association with each other. In another example embodiment, IC tags holding identification information assigned to the plants to be grown, or labels printed with QR codes (registered trademark) or barcodes containing identification information of the plants are added to the plants, and the growth state measurement unit may acquire the identification information of the plants to be grown from the IC tags, the QR codes (registered trademark), or the barcodes, and store the identification information and the growth state information of the plants in the recording unit 40 in association with each other.

The recording unit 40 is an information processing apparatus such as a data server including a storage device that stores growth state information of the plants to be grown. When the recording unit 40 receives growth state information from the growth management unit 30, the recording unit 40 stores the growth state information in the storage device included therein and provides the growth state information to the correlation deriving unit 60.

The sampling unit 50 is an apparatus that takes samples of the plants to be grown in accordance with the sampling condition provided by the planning unit 10 and analyzes the type, the amount, and the concentration of the component contained in each sample. Conceivable specific examples of the components contained in the plants to be grown include various substances such as amino acids, fats, sugars, vitamins, salts, minerals, and potassium. Further, the components of the plants that can be analyzed by the sampling unit 50 include harmful substances such as carcinogenic substances. The sampling unit 50 transmits contained component information indicating the type, the amount, and the concentration of the component contained in each plant to be grown to the correlation deriving unit 60 as the result of analysis.

The correlation deriving unit 60 is an information processing apparatus that can derive a correlation between growth condition information indicating the growth condition of plants to be grown, and growth state information and contained component information of the plants, and can generate weighted learning data indicating the main correlation of these pieces of information. The correlation deriving unit 60 includes the first neural network that uses growth condition information included in a growth plan as input data to output growth state information and contained component information of plants as output data. The first neural network includes an input layer, an intermediate layer, and an output layer, and these layers are composed of artificial neurons that are programs executed by an arithmetic unit included in the correlation deriving unit 60. The correlation deriving unit 60 uses, as training data, growth condition information included in the growth plan, and actual growth state information and contained component information of plants that are grown under the growth condition indicated by the growth condition information, and repeatedly performs deep learning to correct the parameters used by each artificial neuron, thereby causing the first neural network to learn. The correlation deriving unit 60 transmits the weighted learning data obtained by the learning of the first neural network, that is, the parameter group corrected by each artificial neuron of the first neural network, to the planning unit 10. When the growth condition determining unit 11 of the planning unit 10 receives the weighted learning data from the correlation deriving unit 60, the growth condition determining unit 11 inputs the weighted learning data to the second neural network to generate growth condition information. That is, the growth condition determining unit 11 updates the growth plan using the weighted learning data fed back from the correlation deriving unit 60 and provides growth condition information of the growth plan to the growth condition setting unit 20.

Figure 2:
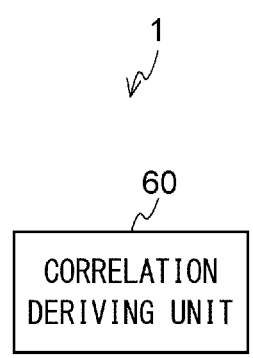
FIG. 2 is a block diagram showing a main component included in the growth analysis system according to the example aspect of the present disclosure.

FIG. 2 is a block diagram showing a main component included in the growth analysis system according to the example aspect of the present disclosure. The growth analysis system 1 includes the correlation deriving unit 60 that derives a correlation between growth condition of one or more plants to be grown, and growth state information and contained component information of the plants.

Figure 3:
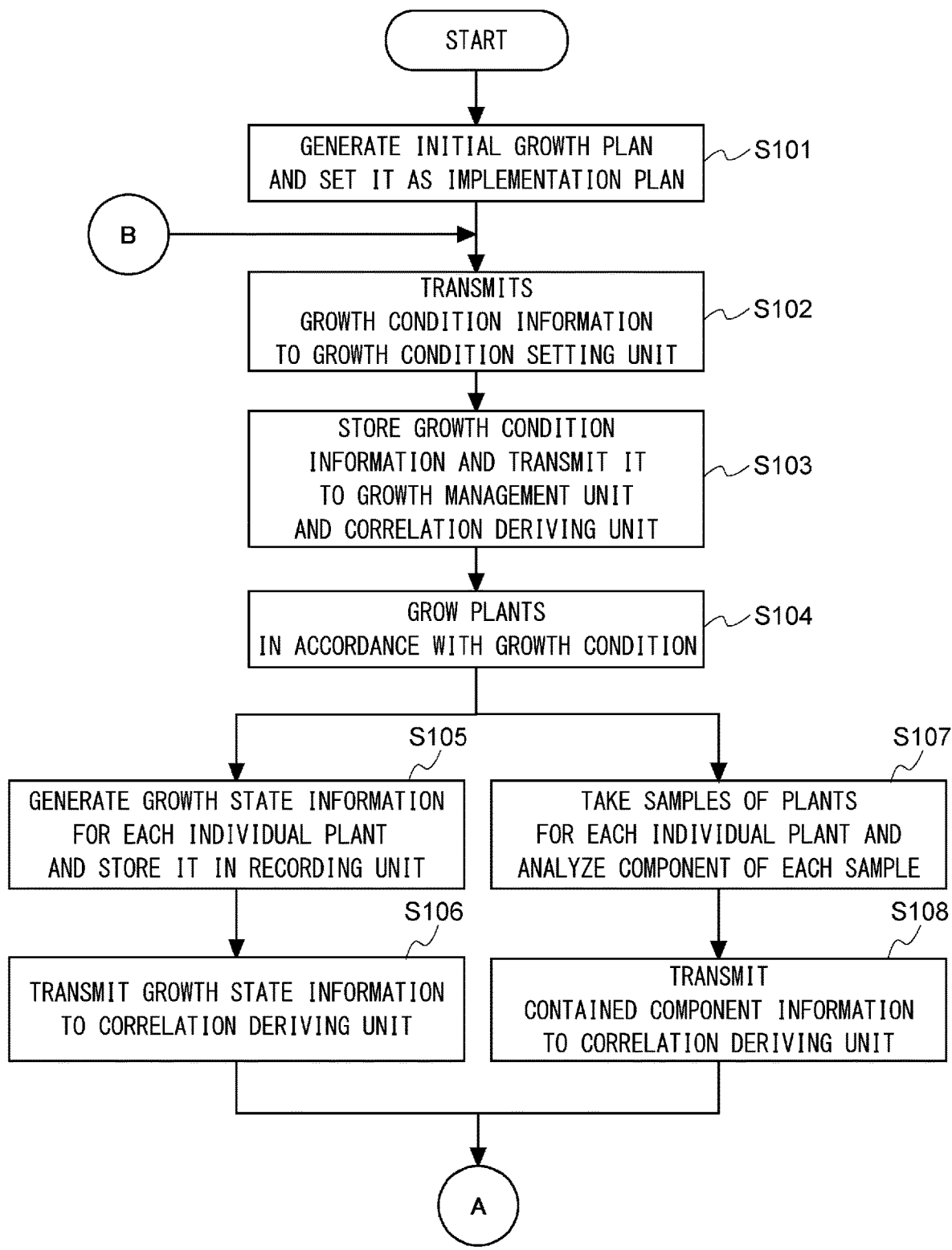
FIG. 3 is a flowchart showing an example of a process performed by the growth analysis system 1 according to an example aspect of the present disclosure.
Figure 4:
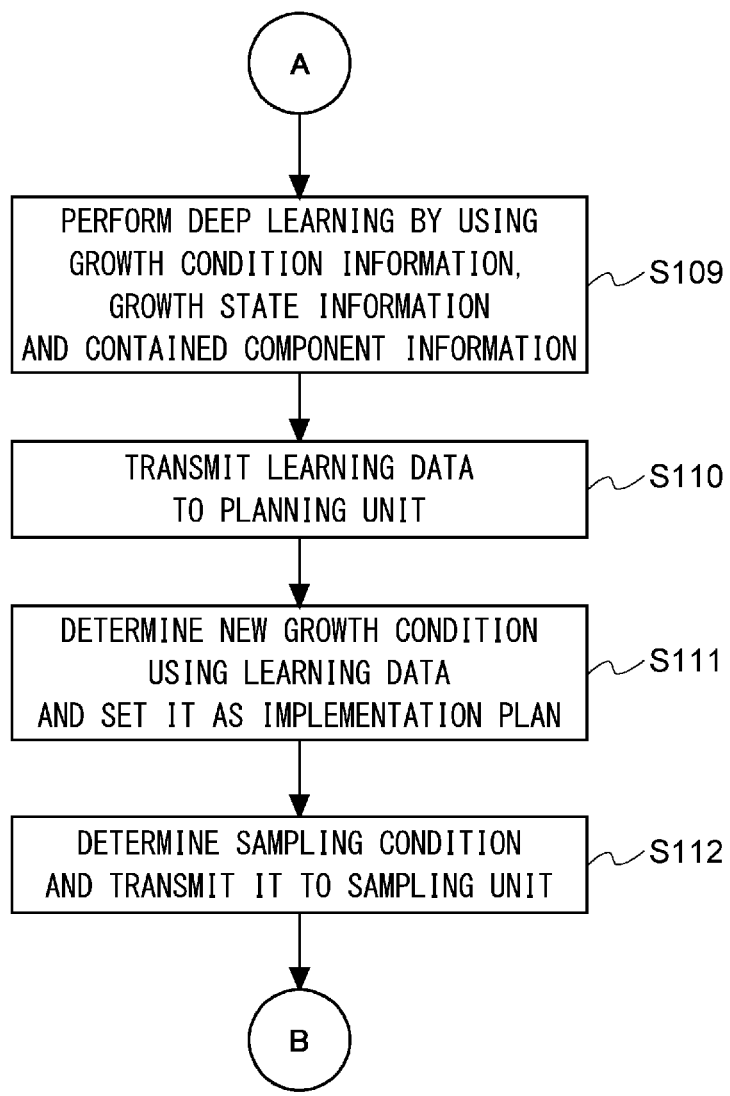
FIG. 4 is a flowchart showing an example of a process performed by the growth analysis system 1 according to an example aspect of the present disclosure.

FIGS. 3 and 4 are flowcharts showing an example of a process performed by the growth analysis system 1 according to an example aspect of the present disclosure. An example of the process for the plants to be grown in one growth chamber is described hereinafter with reference to FIGS. 3 and 4.

In Step S101, the planning unit 10 generates an initial growth plan and sets it as an implementation plan in its own storage device. In Step S102, the planning unit 10 transmits growth condition information indicating a growth condition constituting the set implementation plan to the growth condition setting unit 20. In Step S103, the growth condition setting unit 20 stores the growth condition information in its own storage device and transmits the growth condition information to the growth management unit 30 and the correlation deriving unit 60.

In Step S104, the growth management unit 30 grows plants in accordance with the growth condition indicated by the growth condition information that is received from the growth condition setting unit 20. In Step S105, the growth management unit 30 measures a growth state of each plant at a predetermined timing, generates growth state information for each individual plant, and stores the growth state information in the recording unit 40. Note that it is preferred that the timing at which the growth management unit 30 measures a growth state of each plant be the same as the timing at which the sampling unit 50 takes a sample of each plant. In Step S106, the recording unit 40 transmits the growth state information to the correlation deriving unit 60.

Meanwhile, in Step S107, the sampling unit 50 takes samples of the plants for each individual plant at a timing specified by a sampling condition and analyzes the component of each sample taken by the sampling unit 50. Note that when an initial growth plan is set as the implementation plan, the sampling unit 50 uses a predetermined sampling condition as the sampling condition. In Step S108, the sampling unit 50 transmits contained component information obtained by the analysis of the components of the samples to the correlation deriving unit 60.

In Step S109, the correlation deriving unit 60 inputs, as training data, the growth condition information received from the growth condition setting unit 20, the growth state information received from the growth management unit 30, and the contained component information received from the sampling unit 50 to the neural network included in the correlation deriving part 60, and performs deep learning. In Step S110, the correlation deriving unit 60 transmits the parameters corrected by the deep learning to the planning unit 10 as weighted learning data.

In Step S111, the planning unit 10 inputs the weighted learning data received from the correlation deriving unit 60 to the first neural network, determines a new growth condition, and sets it as an implementation plan. In Step S112, the planning unit 10 determines the sampling condition and transmits it to the sampling unit 50. Next, the process returns to Step S102, and measurement of the growth and the state of the plants to be grown and analysis of the components of the plants to be grown are performed in accordance with the new growth condition set as the implementation plan.

The above-described example embodiment has the following effects. In the first neural network included in the correlation deriving unit 60, the correlation deriving unit 60 repeatedly performs deep learning using, as training data, growth condition information indicating a growth condition of one or more organisms to be grown and contained component information indicating a component contained in the organisms that are actually grown in accordance with the growth condition, thereby causing the first neural network to learn. This configuration enables a user to recognize the growth condition and the component contained in the organisms, which is estimated when the organisms are grown in accordance with the growth condition, by inputting the growth condition information indicating an optional growth condition of the organisms to be grown to the first neural network.

Further, when the growth condition determination unit 11 receives the weighted learning data from the correlation deriving unit 60, the growth condition determination unit 11 inputs the weighted learning data to the second neural network to generate growth condition information. That is, the growth condition determining unit 11 can update the growth plan using the weighted learning data fed back from the correlation deriving unit 60. Then, in the first neural network, the correlation deriving unit 60 repeatedly performs deep learning using, as training data, the growth condition information generated by the growth condition determining unit 11 and the contained component information indicating the component contained in the organisms that are actually grown in accordance with the growth condition. Thus, it is possible to automatically and comprehensively derive a correlation between the growth condition of the organisms to be grown and the contained component thereof based on various types of growth conditions generated using the weighted learning data.

Each information processing apparatus implementing the planning unit 10, the growth condition setting unit 20, the growth management unit 30, the recording unit 40, the sampling unit 50, and the correlation derivation unit 60, which constitute the growth analysis system 1, includes an arithmetic unit such as a Central Processing Unit (CPU) and a storage device including a Read Only Memory (ROM) and a Random Access Memory (RAM). In these information processing apparatuses, the growth analysis method according to the present disclosure is executed by the arithmetic unit developing, in the RAM, the growth analysis program according to the present disclosure stored in the ROM and executing it.

In the above-described example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

According to the present disclosure, it is possible to provide a growth analysis system, a growth analysis method, and a growth analysis program that can derive a correlation between a growth condition of one or more organisms to be grown and a component contained in the organisms that are grown in accordance with the growth condition.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims. For example, in the above-described example embodiment, although one or more plants are one or more organisms to be grown, other organisms (such as livestock and fish) can be subjects to be grown. In a case where animals such as livestock and fish are subjects to be grown, at least one of the types of food given to these animals and time information such as the timing and the time for giving food to these animals can be used as a growth condition. That is, in the example embodiment in which one or more organisms to be grown are one or more animals, the growth condition information includes at least one of the temperature, the humidity, the illuminance, and the carbon dioxide concentration of the environment in which the animals are grown, the amount and the temperature of water given to the animals, and the type, the amount, and the time information of food. Further, the growth state information includes at least one of the size of the animals, the shape thereof, and the color thereof. Furthermore, the contained component information includes at least one of the type of the component contained in the animals, the amount thereof, and the concentration thereof.

Further, in the processes shown in FIGS. 3 and 4, when one growth chamber is prepared as a growth chamber for the plants to be grown, the planning unit 10 provides growth conditions to the growth condition setting unit 20 one by one. However, when a plurality of growth chambers are prepared as growth chambers for plants to be grown, the planning unit 10 provides a plurality of growth conditions to the growth condition setting unit 20 at the same time, and the growth management unit 30 can adjust the environment of each growth chamber in accordance with these growth conditions.

Further, in the above-described example embodiment, the correlation deriving unit 60 causes the first neural network to learn by using, as training data, both growth condition information included in the growth plan, actual growth state information and contained component information of the plants that are grown under the growth condition indicated by the growth condition information. However, in another example embodiment, the correlation deriving unit 60 may cause the first neural network to learn by using, as training data, only growth condition information included in the growth plan and actual contained component information of the plants that are grown under the growth condition indicated by the growth condition information, without growth state information being used.

What is claimed is:

1. A growth analysis system, comprising:
a correlation deriving unit comprising a first neural network that uses growth condition information as input data to output contained component information as output data, the growth condition information indicating a growth condition of one or more organisms to be grown and the contained component information indicating a component contained in the organisms, wherein
the correlation deriving unit causes the first neural network to learn by repeatedly performing deep learning using, as training data, the growth condition information and the contained component information indicating the component contained in the organisms that are actually grown in accordance with the growth condition.

2. The growth analysis system according to claim 1, further comprising:

a growth condition determining unit comprising a second neural network that uses weighted learning data as input data to output growth condition information as output data, the weighted learning data being obtained by the learning of the first neural network that is provided by the correlation deriving unit and the growth condition information indicating the growth condition of the organisms to be grown, wherein in response to receiving the weighted learning data from the correlation deriving unit, the growth condition determining unit inputs the weighted learning data to the second neural network to generate growth condition information, and the correlation deriving unit uses, as training data, the growth condition information generated by the growth condition determining unit and the contained component information indicating the component contained in the organisms that are actually grown in accordance with the growth condition.

3. The growth analysis system according to claim 1, wherein in a case where the organisms to be grown are one or more plants, the growth condition information includes at least one of a temperature, humidity, illuminance, and a carbon dioxide concentration of an environment in which the plants are grown, an amount and a temperature of water given to the plants, and a type and an amount of a fertilizer given to the plants, and the contained component information includes at least one of a type, an amount, and a concentration of a component contained in the plants.

4. The growth analysis system according to claim 1, wherein in a case where the organisms to be grown are one or more animals, the growth condition information includes at least one of a temperature, humidity, illuminance, and a carbon dioxide concentration of an environment in which the one or more animals are grown, an amount and a temperature of water given to the one or more animals, and a type, an amount, and time information of food given to the one or more animals, and the contained component information includes at least one of a type, an amount, and a concentration of a component contained in the one or more animals.

5. The growth analysis system according to claim 1, wherein the correlation deriving unit causes the first neural network to learn by repeatedly performing deep learning using, as training data, the growth condition information indicating the growth condition of the organisms to be grown and growth state information indicating a growth state of the organisms that are actually grown in accordance with the growth condition.

6. The growth analysis system according to claim 5, wherein the growth state information includes at least one of a size of the organisms, a shape thereof, and a color thereof.

7. A growth analysis method comprising repeatedly performing, in a neural network that uses growth condition information indicating a growth condition of one or more organisms to be grown as input data to output contained component information indicating a component contained in the organisms as output data, deep learning using, as training data, the growth condition information and the contained component information indicating the component contained in the organisms that are actually grown in accordance with the growth condition.

8. Non-transitory computer readable medium storing a growth analysis program for causing an arithmetic device provided in an information processing apparatus to repeatedly perform, in a neural network that uses growth condition information indicating a growth condition of one or more organisms to be grown as input data to output contained component information indicating a component contained in the organisms as output data, deep learning using, as training data, the growth condition information and the contained component information indicating the component contained in the organisms that are actually grown in accordance with the growth condition.

* * * * *